(12) United States Patent
Gormley

(10) Patent No.: US 12,270,358 B2
(45) Date of Patent: Apr. 8, 2025

(54) LOCKING ASSEMBLY FOR AN AIRCRAFT PROPULSION SYSTEM THRUST REVERSER

(71) Applicant: Rohr, Inc., Chula Vista, CA (US)

(72) Inventor: Timothy Gormley, Bonita, CA (US)

(73) Assignee: Rohr, Inc., Chula Vista, CA (US)

(*) Notice: Subject to any disclaimer, the term of this patent is extended or adjusted under 35 U.S.C. 154(b) by 0 days.

(21) Appl. No.: 18/229,484

(22) Filed: Aug. 2, 2023

(65) Prior Publication Data

US 2025/0043749 A1 Feb. 6, 2025

(51) Int. Cl.
*F02K 1/76* (2006.01)

(52) U.S. Cl.
CPC .......... *F02K 1/766* (2013.01); *F05D 2260/50* (2013.01)

(58) Field of Classification Search
CPC .... F02K 1/1238; F02K 1/1246; F02K 1/1261; F02K 1/1276; F02K 1/1284; F02K 1/1292; F02K 1/625; F02K 1/72; F02K 1/766; F05D 2260/50
See application file for complete search history.

(56) References Cited

U.S. PATENT DOCUMENTS

| | | | |
|---|---|---|---|
| 3,797,785 A * | 3/1974 | Baerresen | F02K 1/09 239/265.31 |
| 4,005,822 A * | 2/1977 | Timms | F02K 1/72 244/110 B |
| 8,793,973 B2 | 8/2014 | Vauchel | |
| 9,611,808 B2 | 4/2017 | Gormley | |
| 11,378,037 B2 | 7/2022 | Song | |
| 2015/0267641 A1* | 9/2015 | Gormley | F02K 1/766 239/265.19 |
| 2017/0298870 A1 | 10/2017 | Boileau | |
| 2021/0108594 A1* | 4/2021 | Song | F02K 1/766 |
| 2022/0186684 A1* | 6/2022 | Peyron | F02K 1/72 |

OTHER PUBLICATIONS

EP Search Report for EP Patent Application No. 24192722.7 dated Dec. 17, 2024.

* cited by examiner

*Primary Examiner* — Scott J Walthour
(74) *Attorney, Agent, or Firm* — Getz Balich LLC

(57) ABSTRACT

A thrust reverser for an aircraft propulsion system includes a fixed thrust reverser structure including a wall, a sleeve configured to translate between a first stowed position and a second position, and a blocker door assembly including a plurality of blocker doors. An upstream end of the sleeve is disposed at the wall with the translating sleeve in the first stowed position. A locking assembly includes a locking body and a receiver. Each blocker door includes a body pivotably mounted to the sleeve by a hinge and the locking body. Translation of the sleeve from the first to the second position effects pivoting of the blocker door body from a first stowed position to a second position. In a locked position, the locking body is engaged with the wall and disposed at the receiver. In an unlocked position, the locking body is disengaged with the wall and the receiver.

20 Claims, 13 Drawing Sheets

LOCKING ASSEMBLY FOR AN AIRCRAFT PROPULSION SYSTEM THRUST REVERSER

BACKGROUND

1. Technical Field

This disclosure relates generally to a thrust reverser for an aircraft propulsion system and, more particularly, to a locking assembly for a blocker door of the thrust reverser.

2. Background Information

Aircraft propulsion systems may include thrust reversers configured for redirecting air flow in an at least partially forward direction to generate reverse thrust for the propulsion system. Some thrust reversers include blocker doors configured for selectively changing position to control the direction of the air flow. Various systems are known in the art for controlling the movement of these blocker doors. While these known systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a thrust reverser for an aircraft propulsion system includes a fixed thrust reverser structure, a translating sleeve, and a blocker door assembly. The first thrust reverser structure includes a wall extending circumferentially about an axis of the thrust reverser. The translating sleeve extends circumferentially about the axis to form a thrust reverser duct of the thrust reverser. The translating sleeve is configured to translate between a first stowed translating sleeve position and a second translating sleeve position. The translating sleeve includes an upstream end. The upstream end is disposed at the wall with the translating sleeve in the first stowed translating sleeve position. The blocker door assembly includes a plurality of blocker doors. Each blocker door of the plurality of blocker doors includes a blocker door body, a hinge, and a locking assembly. The blocker door body is pivotably mounted to the translating sleeve by the hinge. The blocker door body is pivotable about the hinge between a first stowed blocker door position and a second blocker door position. Translation of the translating sleeve from the first stowed translating sleeve position to the second translating sleeve position effects pivoting of the blocker door body from the first stowed blocker door position to the second blocker door position. The locking assembly includes a locking body and a receiver. The locking body is moveable between a locked position and an unlocked position. In the locked position, the locking body is engaged with the wall and the locking body is disposed at the receiver. In the unlocked position, the locking body is disengaged with the wall and the receiver to allow the blocker door body to pivot from the first stowed blocker door position to the second blocker door position as the translating sleeve translates from the first stowed translating sleeve position to the second translating sleeve position.

In any of the aspects or embodiments described above and herein, the locking assembly may further include a roller rotatably mounted to the locking body. The locking body may engage the wall with the roller in the first stowed blocker door position.

In any of the aspects or embodiments described above and herein, the locking assembly may further include a biasing element. The biasing element may be configured to bias the locking body in the unlocked position.

In any of the aspects or embodiments described above and herein, the receiver may be fixedly mounted to the translating sleeve.

In any of the aspects or embodiments described above and herein, the locking body may be pivotably mounted to the blocker door body at a pivot axis.

In any of the aspects or embodiments described above and herein, the locking body may include a first arm portion and a second arm portion. The first arm portion may intersect the second arm portion at the pivot axis. The first arm portion may include a first distal end configured to engage the wall with the locking body in the locked position. The second arm portion may include a second distal end and a hook disposed at the second distal end. The hook may be configured to be disposed at the receiver with the locking body in the locked position.

In any of the aspects or embodiments described above and herein, the first arm portion may be oriented orthogonally relative to the second arm portion.

In any of the aspects or embodiments described above and herein, the second arm portion may be pivotably mounted to the blocker door body at the hook.

In any of the aspects or embodiments described above and herein, the receiver may be fixedly mounted to the blocker door body.

In any of the aspects or embodiments described above and herein, the locking assembly may further include a housing fixedly mounted to the translating sleeve. The locking body may be mounted within the housing. The locking body may be configured to translate within the locking body between the locked position and the unlocked position.

In any of the aspects or embodiments described above and herein, the receiver may include a roller. The roller may be engaged with the locking body with the locking body in the locked position.

In any of the aspects or embodiments described above and herein, the locking body may include a hook. The blocker door body may form the receiver. The receiver may form a slot. The hook may be disposed within the slot with the locking body in the locked position.

In any of the aspects or embodiments described above and herein, the wall may slope radially outward in an axially forward to an axially aft direction.

In any of the aspects or embodiments described above and herein, the thrust reverser may further include an inner fixed structure forming an inner radial boundary of the thrust reverser duct. Each blocker door of the plurality of blocker doors may further include a drag link pivotably mounted to the inner fixed structure and the blocker door body.

According to another aspect of the present disclosure, a thrust reverser for an aircraft propulsion system includes a torque box, a translating sleeve, and a blocker door assembly. The torque box includes a wall extending circumferentially about an axis of the thrust reverser. The translating sleeve is disposed aft of the torque box. The translating sleeve is configured to translate between a forward translating sleeve position and an aft translating sleeve position. The blocker door assembly includes a plurality of blocker doors. Each blocker door of the plurality of blocker doors includes a blocker door body, a hinge, and a locking assembly. The blocker door body is pivotably mounted to the translating sleeve by the hinge. The blocker door body is pivotable about the hinge between a first stowed blocker door position and a second blocker door position. Translation of the translating sleeve from the forward translating sleeve position to the aft translating sleeve position effects pivoting of the blocker door body from the first stowed blocker door position to the second blocker door position. The locking assembly includes a locking body and a receiver. The locking body is moveable between a locked position and an unlocked position. In the locked position, the locking body is engaged with the wall and the receiver to lock the blocker door body in the first stowed blocker door position. Translation of the translating sleeve from the forward translating sleeve position to the aft translating sleeve position effects movement of the locking body from the locked position to the unlocked position with the locking body disengaged from the wall and the receiver in the unlocked position.

In any of the aspects or embodiments described above and herein, the locking assembly may further include a roller rotatably mounted to the locking body. The locking body may engage the wall with the roller in the first stowed blocker door position.

In any of the aspects or embodiments described above and herein, the locking assembly may further include a biasing element. The biasing element may be configured to bias the locking body in the unlocked position.

In any of the aspects or embodiments described above and herein, the biasing element may be a spring.

According to another aspect of the present disclosure, a thrust reverser for an aircraft propulsion system includes a fixed thrust reverser structure, a translating sleeve, and a blocker door assembly. The fixed thrust reverser structure includes a wall extending circumferentially about an axis of the thrust reverser. The translating sleeve extends circumferentially about the axis to form a thrust reverser duct of the thrust reverser. The translating sleeve is configured to translate between a first stowed translating sleeve position and a second translating sleeve position. The blocker door assembly includes a plurality of blocker doors. Each blocker door of the plurality of blocker doors includes a blocker door body, a hinge, and a locking assembly. The blocker door body is pivotably mounted to the translating sleeve by the hinge. The blocker door body is pivotable about the hinge between a first stowed blocker door position and a second blocker door position. The locking assembly includes a locking body, a roller, a biasing element, and a receiver. The locking body is moveable between a locked position and an unlocked position. The roller is rotatably mounted to the locking body at a forward end of the locking body. The biasing element is configured to bias the locking body in the unlocked position. In the locked position, the roller is engaged with the wall. In the unlocked position, the roller is disengaged with the wall to allow the blocker door body to pivot from the first stowed blocker door position to the second blocker door position.

In any of the aspects or embodiments described above and herein, the wall may slope radially outward in an axially forward to an axially aft direction. The wall may form an outer surface having a convex shape facing the axis.

The present disclosure, and all its aspects, embodiments and advantages associated therewith will become more readily apparent in view of the detailed description provided below, including the accompanying drawings.

DETAILED DESCRIPTION

Figure 1:
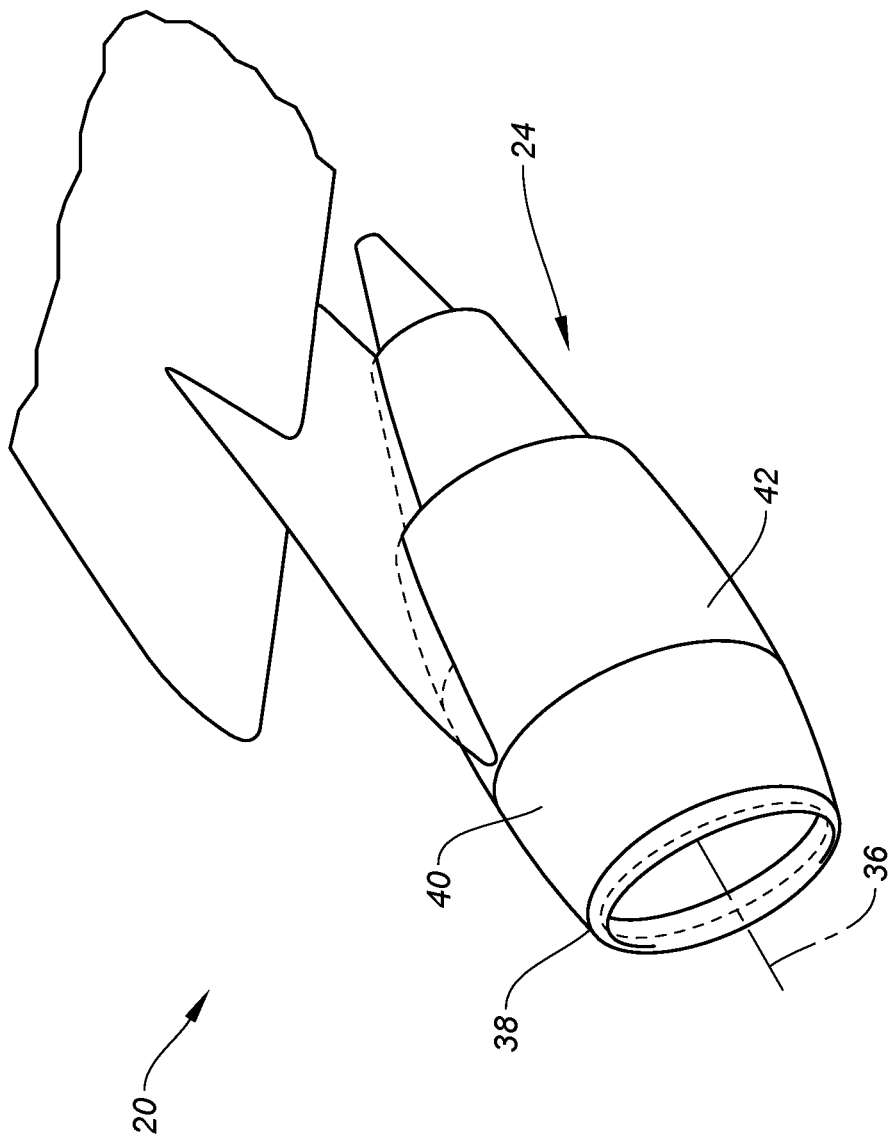
FIG. 1 illustrates a perspective view of an aircraft propulsion system, in accordance with one or more embodiments of the present disclosure.
Figure 2:
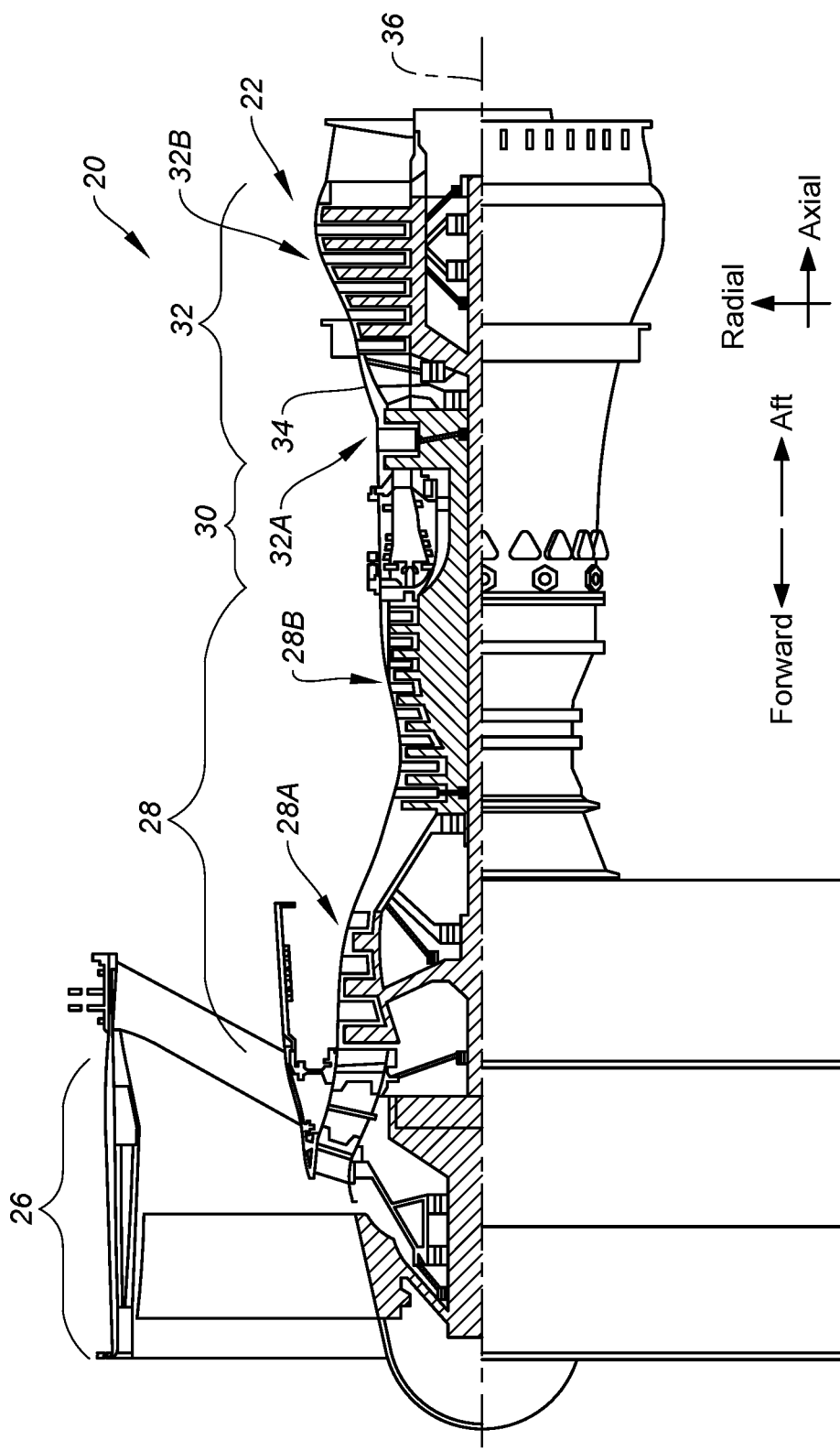
FIG. 2 illustrates a cutaway view of a gas turbine engine for an aircraft propulsion system, in accordance with one or more embodiments of the present disclosure.

FIGS. 1 and 2 illustrate a propulsion system 20 for an aircraft. The propulsion system 20 includes a gas turbine engine 22 and a nacelle 24. This gas turbine engine 22 may be configured as a high-bypass turbofan engine. Alternatively, the gas turbine engine 22 may be configured as any other type of gas turbine engine capable of propelling the aircraft during flight.

The gas turbine engine 22 of FIG. 2 includes a fan section 26, a compressor section 28, a combustor section 30, a turbine section 32, and an engine static structure 34. The gas turbine engine 22 sections 26, 28, 30, 32 of FIG. 1 are arranged sequentially along an axial centerline 36 (e.g., a rotational axis) of the gas turbine engine 22. The compressor section 28 may include a low-pressure compressor (LPC) 28A and a high-pressure compressor (HPC) 28B. The turbine section 32 may include a high-pressure turbine (HPT) 32A and a low-pressure turbine (LPT) 32B. The present disclosure, however, is not limited to the particular gas turbine engine 22 configuration of FIG. 2.

The engine static structure 34 may include, for example, one or more engine cases for the gas turbine engine 22. The engine static structure 34 may additionally include cowlings, bearing assemblies, and/or other structural components of the gas turbine engine 22. The one or more engine cases form, house, and/or structurally support components of the gas turbine engine 22 sections 26, 28, 30, 32.

The nacelle 24 is configured to house and provide an aerodynamic cover for the gas turbine engine 22. The nacelle 24 of FIG. 1 generally includes an air intake 38, a fan cowl 40, and a thrust reverser 42. At least a portion of the thrust reverser 42 may be configured to move (e.g., axially translate) relative to the air intake 38 and the fan cowl 40.

Figure 3:
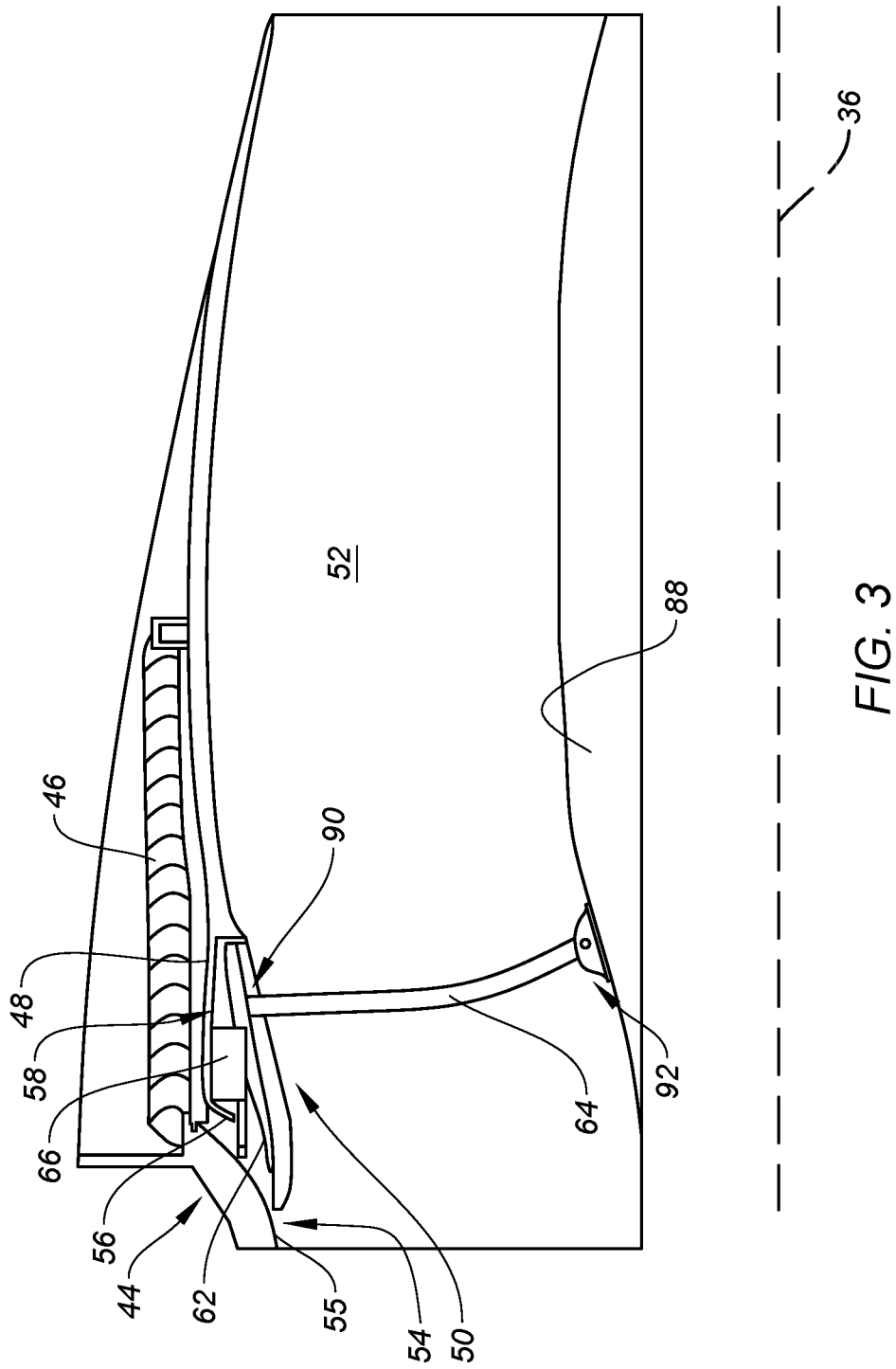
FIG. 3 illustrates a cutaway view of a portion of a thrust reverser for an aircraft propulsion system, the thrust reverser including a translating sleeve and a blocker door assembly, and the translating sleeve in a stowed position, in accordance with one or more embodiments of the present disclosure.
Figure 4:
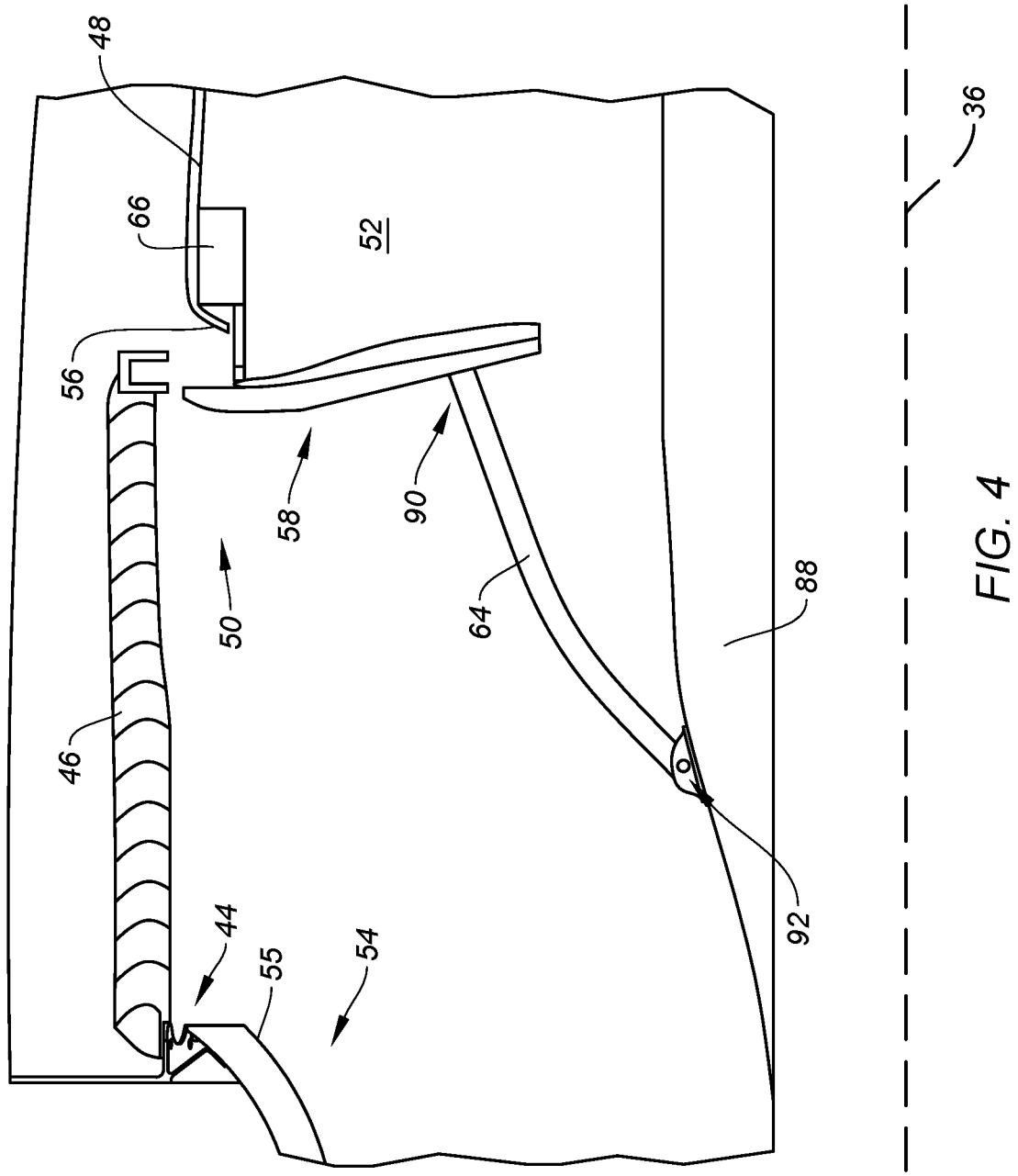
FIG. 4 illustrates a cutaway view of a portion of the thrust reverser of FIG. 3 with the translating sleeve in a deployed position, in accordance with one or more embodiments of the present disclosure.

Referring to FIGS. 3 and 4, the thrust reverser 42 may be configured as a cascade-type thrust reverser. The thrust reverser 42 of FIG. 3 includes a torque box 44, a plurality of cascade elements 46, a translating sleeve 48, and a blocker door assembly 50. The thrust reverser 42 surrounds and forms a thrust reverser duct 52 configured to receive and direct air flow (e.g., bypass air flow) from the gas turbine engine 22 to provide thrust for the propulsion system 20 (see FIGS. 1 and 2).

The torque box 44 forms a portion of a fixed structure of the thrust reverser 42. The torque box 44 mounts (e.g., structurally connects) the components of the thrust reverser 42 to the gas turbine engine 22 (e.g., the engine static structure 34). The torque box 44 includes a downstream wall 54 (sometimes referred to as a "bull nose" or a "bull nose fairing"). The downstream wall 54 extends circumferentially about (e.g., completely around) the axial centerline 36. The downstream wall 54 may slope radially outward in an axially forward to axially aft direction. The downstream wall 54 forms an outer surface 55 facing the blocker door assembly 50. The outer surface 55 may be a curved outer surface (e.g., a convex outer surface) as shown, for example, in FIG. 3.

The cascade elements 46 are disposed between (e.g., radially between) the thrust reverser duct 52 and an exterior of the nacelle 24. The cascade elements 46 extend from the torque box 44 in an axially aftward direction. The cascade elements 46 may be arranged about the axial centerline 36 as a circumferential array of cascade elements 46. The cascade elements 46 may include a plurality of cascade vanes or other airflow directing structures configured to direct air from the thrust reverser duct 52 out of the propulsion system 20 and in an axially forward direction to provide reverse thrust for the propulsion system 20 (see FIGS. 1 and 2).

The translating sleeve 48 extends circumferentially about (e.g., completely around) the axial centerline 36. The translating sleeve 48 forms and circumscribes the thrust reverser duct 52. The translating sleeve 48 further circumscribes the blocker door assembly 50. The translating sleeve 48 may be formed by a single tubular body or a plurality of circumferential sleeve segments assembled together to form the translating sleeve 48. The translating sleeve 48 includes an upstream end 56 (e.g., an axially forward end). The translating sleeve 48 may include a seal at (e.g., on, adjacent, or proximate) the upstream end 56, for example, to sealingly engage the downstream wall 54 (e.g., the outer surface 55).

The translating sleeve 48 is configured for translation (e.g., axial movement) between a stowed position (e.g., an axially forward position; see FIG. 3), a deployed position (e.g., an axially aft position; see FIG. 4), and intermediate positions between the stowed position and the deployed position. In the stowed position, the translating sleeve 48 may be disposed between the thrust reverser duct 52 and the cascade elements 46 to direct air flow along the thrust reverser duct 52 and to prevent or impede air flow from the thrust reverser duct 52 through the cascade elements 46. In this stowed position, the upstream end 56 may be disposed at (e.g., on, adjacent, or proximate) the downstream wall 54. In the deployed position, the translating sleeve 48 is positioned (e.g., aft of the stowed position) to allow air flow from the thrust reverser duct 52 to flow through the cascade elements 46. In this deployed position, the upstream end 56 is spaced from (e.g., axially spaced from) the downstream wall 54, for example, downstream of (e.g., axially aft of) the cascade elements 46. The thrust reverser 42 may include one or more actuation systems (not shown) for controlling translation of the translating sleeve 48 between the stowed position and the deployed position. The present disclosure, however, is not limited to any particular actuation system configuration for effecting translation of the translating sleeve 48.

Figure 5:
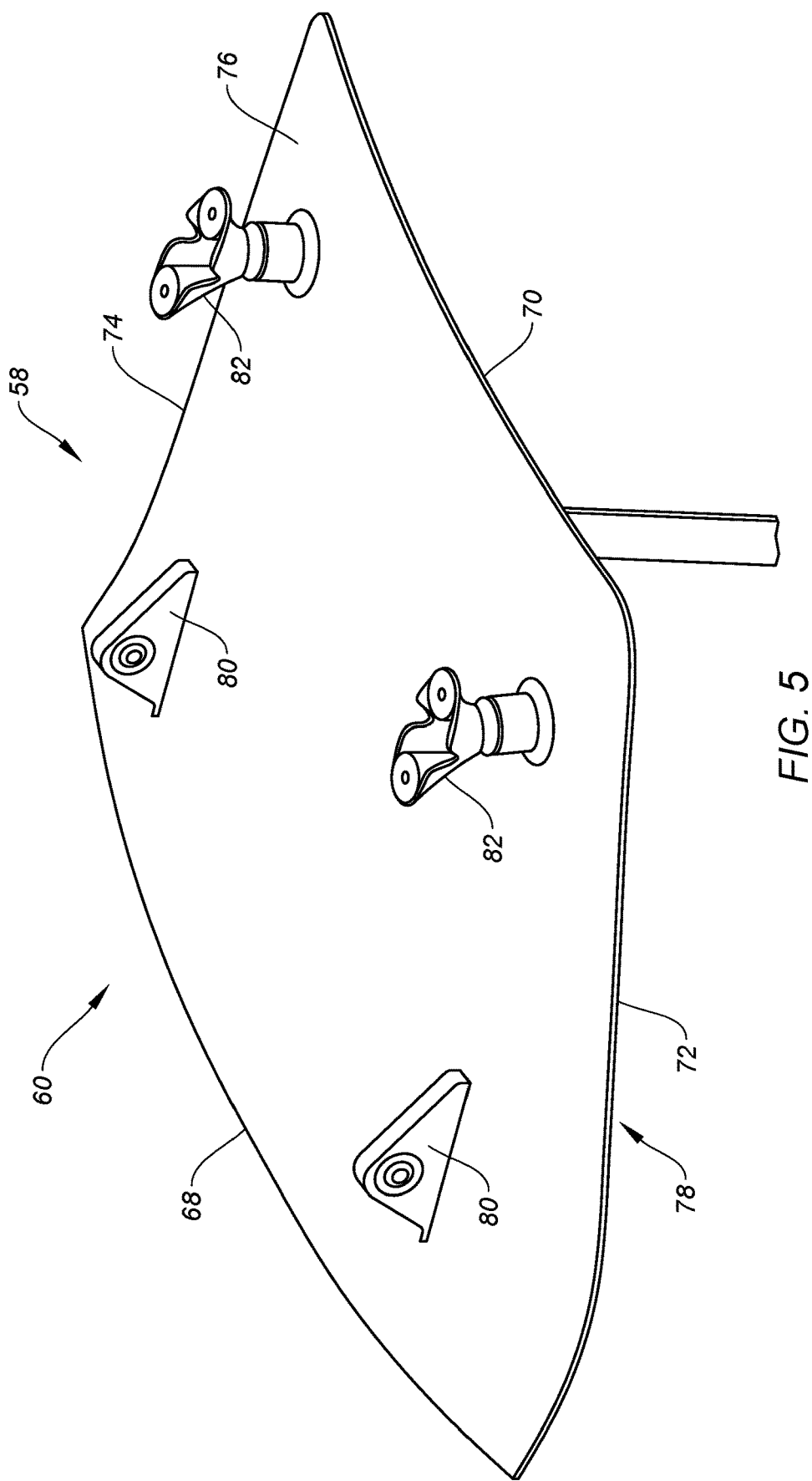
FIG. 5 illustrates a perspective view of a blocker door body for a blocker door of the blocker door assembly of FIG. 3, in accordance with one or more embodiments of the present disclosure.

Referring to FIGS. 3-5, the blocker door assembly 50 includes a plurality of blocker doors 58. The blocker doors 58 are arranged about the axial centerline 36 as a circumferential array of blocker doors 58. The blocker doors 58 are configured for movement with the translating sleeve 48 between the stowed position and the deployed position. Each of the blocker doors 58 includes a blocker door body 60, at least one hinge 62 (omitted for clarity in FIGS. 3 and 4; see FIG. 6), at least one drag link 64, and a locking assembly 66.

The blocker door body 60 extends (e.g., axially extends) between and to an upstream end 68 of the blocker door body 60 and a downstream end 70 of the blocker door body 60. The blocker door body 60 extends between and to a first lateral end 72 of the blocker door body 60 and a second lateral end 74 of the blocker door body 60. The blocker door body 60 extends between and to an outer side 76 (e.g., a radially outer side) of the blocker door body 60 and an inner side 78 (e.g., a radially inner side) of the blocker door body 60. The outer side 76 and the inner side 78 are bounded by the upstream end 68, the downstream end 70, the first lateral end 72, and the second lateral end 74. The blocker door body 60 is configured, for example, as a panel for directing air flow through the thrust reverser duct 52 with the translating sleeve 48 and the blocker doors 58 in the stowed position or directing air flow through the cascade elements 46 with the translating sleeve 48 and the blocker doors 58 in the deployed position. The blocker door body 60 may form or otherwise include one or more mounts 80 for facilitating mounting the blocker door body 60 to the hinge 62. The blocker door body 60 of FIG. 5 includes two mounts 80 for mounting the blocker door body 60 to two respective hinges 62. The present disclosure, however, is not limited the foregoing exemplary configuration or number of the mounts 80 of FIG. 5. The blocker door body 60 may form or otherwise include one or more bumpers 82 disposed at (e.g., on, adjacent, or proximate) the outer side 76. The bumpers 82 may be configured to abut the translating sleeve 48 (e.g., an inner radial side of the translating sleeve 48) to securely position the blocker door body 60 against the translating sleeve 48 with the translating sleeve 48 and the blocker doors 58 in the stowed position.

Figure 6:
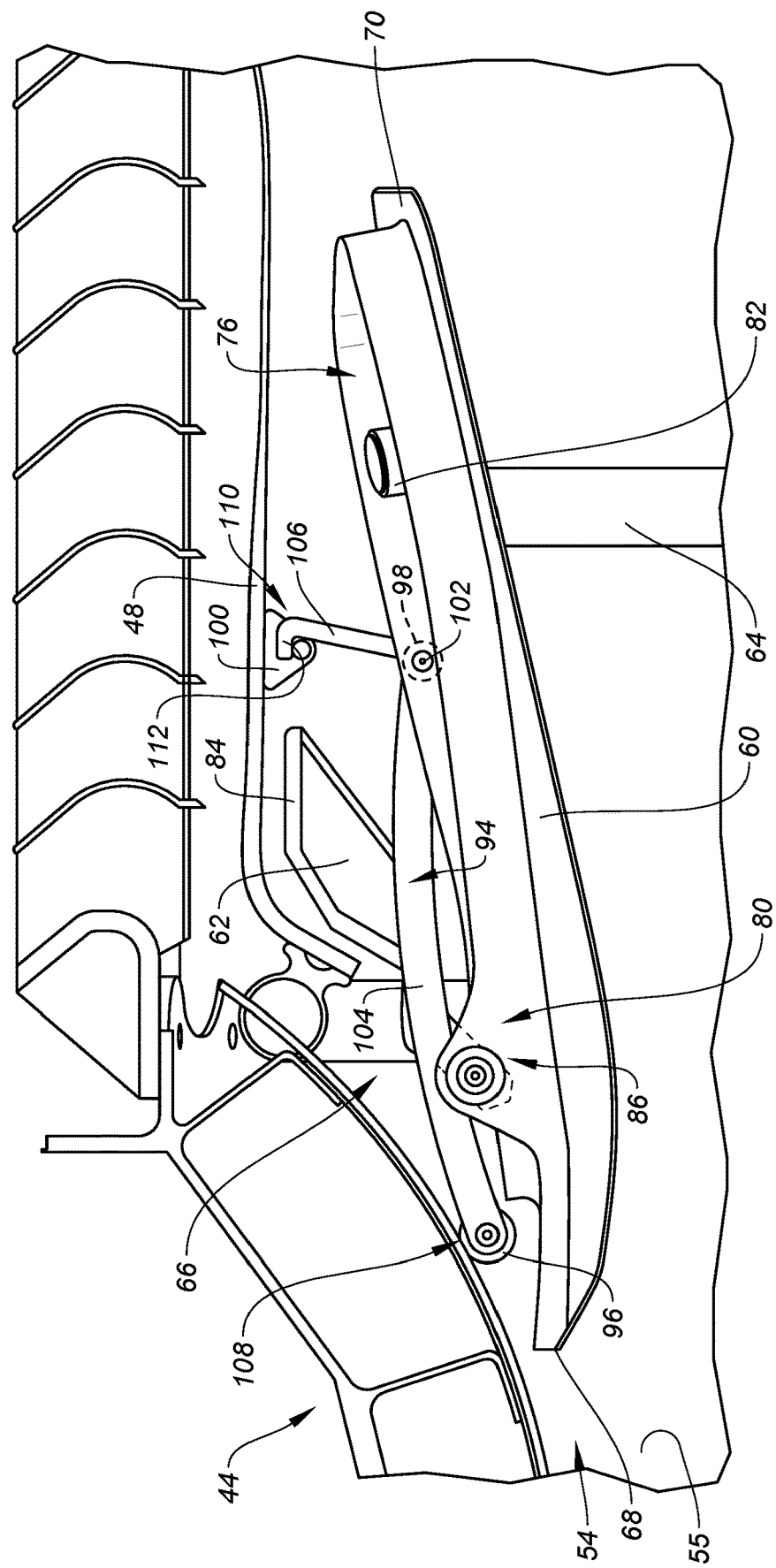
FIG. 6 illustrates a cutaway side view of a blocker door assembly for the thrust reverser of FIG. 3, the blocker door assembly including a locking assembly in a locked condition, in accordance with one or more embodiments of the present disclosure.

Referring briefly to FIG. 6, the hinge 62 pivotably mounts the blocker door body 60 to the translating sleeve 48 (e.g., an inner radial side of the translating sleeve 48). The hinge 62 extends between and to a first end 84 of the hinge 62 and a second end 86 of the hinge 62. The first end 84 is mounted (e.g., fixedly mounted) to the translating sleeve 48, for example, at (e.g., on, adjacent, or proximate) the upstream end 56. The second end 86 is mounted (e.g., pivotably mounted) to the blocker door body 60, for example, one of the mounts 80.

The drag link 64 pivotably mounts the blocker door body 60 to the fixed structure of the thrust reverser 42. For example, the drag link 64 of FIGS. 3-4 pivotably mounts the blocker door body 60 to an inner fixed structure (IFS) 88 of the thrust reverser 42. The IFS 88 extends circumferentially about (e.g., completely around) the axial centerline 36. The IFS 88 forms an inner radial boundary of the thrust reverser duct 52 through the thrust reverser 42. The drag link 64 extends between and to a first end 90 of the drag link 64 and a second end 92 of the drag link 64. The first end 90 is mounted (e.g., pivotably mounted) to the blocker door body 60 at (e.g., on, adjacent, or proximate) the inner side 78. The second end 92 is mounted (e.g., pivotably mounted) to the IFS 88.

In operation, the blocker doors 58 are selectively positioned by translation of the translating sleeve 48 between the stowed position and the deployed position. In the stowed position of the translating sleeve 48 and the blocker doors 58, the blocker doors 58 (e.g., the blocker door body 60) may be positioned against the torque box 44 and/or the translating sleeve 48 to direct air flow through the thrust reverser duct 52 as shown, for example, in FIG. 3. The blocker door body 60 may form a portion of an outer radial boundary of the thrust reverser duct 52 through the thrust reverser 42. As the translating sleeve 48 translates from the stowed position to the deployed position, the drag link 64 may control the blocker door body 60 to pivot about the hinge 62 such that the blocker door body 60 is positioned to obstruct all or at least a substantial portion of the thrust reverser duct 52 (see FIG. 4), thereby directing at least a portion of the air flow from the thrust reverser duct through the cascade elements 46.

During operation of the propulsion system 20 (see FIG. 1), air flow through the thrust reverser duct 52 may impart substantial vibration and other stresses on components of the blocker door assembly 50 and the translating sleeve 48. In at least some conventional blocker door assemblies, the failure of a hinge, a drag link, or another structural component of the blocker door assembly due to these stresses may result in the loss of a blocker door (e.g., a blocker door body). For example, a blocker door may become detached from an associated translating sleeve, and the detached blocker door may be ejected from the associated propulsion system.

The present disclosure blocker doors 58 include the locking assembly 66, as previously discussed. The locking assembly 66 in a locked condition facilitates secure attachment of the blocker door body 60 to the translating sleeve 48 with the translating sleeve 48 and the blocker doors 58 in the stowed position. In other words, the blocker doors 58 may be locked relative to the translating sleeve 48 with the translating sleeve 48 and the blocker doors 58 in the stowed position. The locking assembly 66 in an unlocked condition facilitates movement of the blocker door body 60 into the thrust reverser duct 52 to direct air flow through the cascade elements 46. The positioning of the locking assembly 66 in the locked condition and the unlocked condition is accomplished using the translating motion of the translating sleeve 48.

Figure 7:
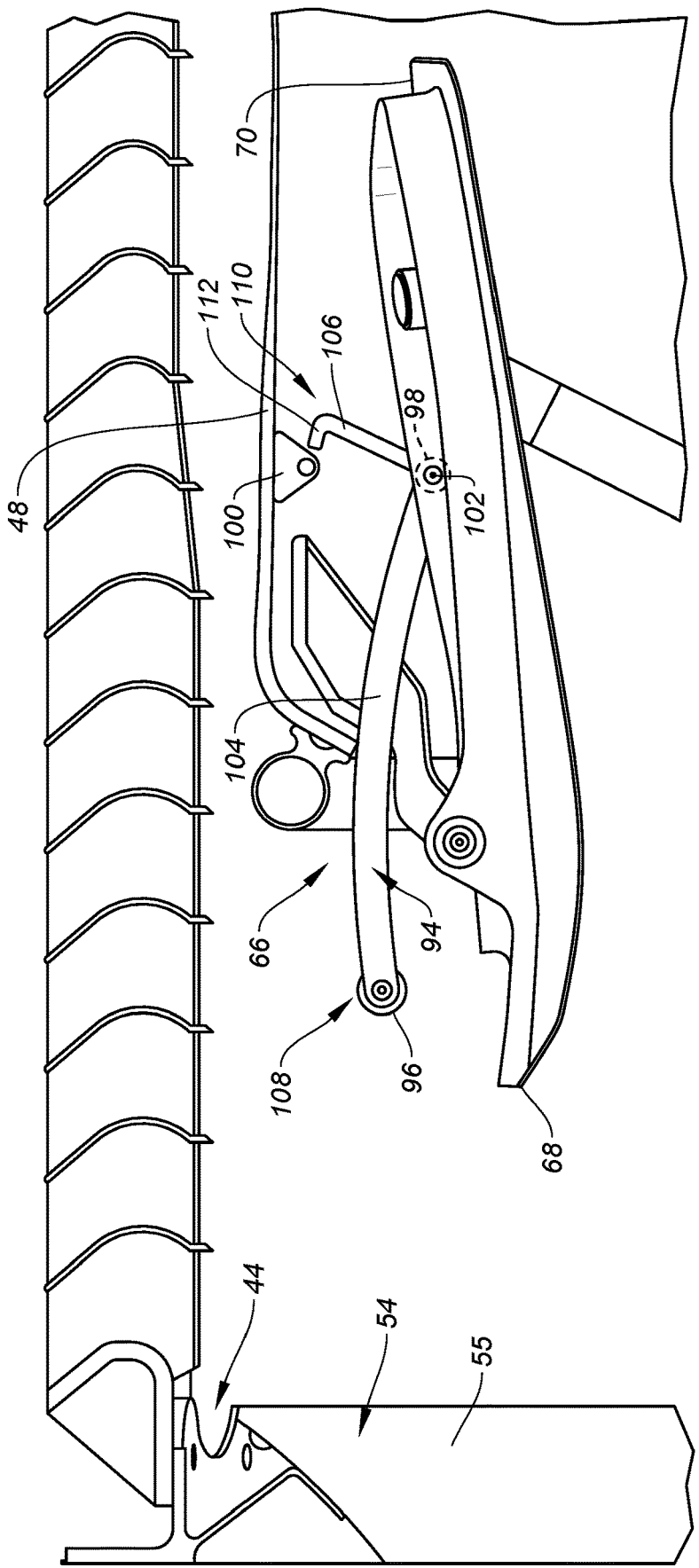
FIG. 7 illustrates a cutaway side view of the blocker door assembly of FIG. 6 with the locking assembly in an unlocked condition, in accordance with one or more embodiments of the present disclosure.

Referring to FIGS. 6 and 7, a first embodiment of the locking assembly 66 is illustrated. FIG. 6 illustrates the locking assembly 66 in the locked condition. FIG. 7 illustrates the locking assembly 66 in the unlocked condition. The locking assembly 66 of FIGS. 6 and 7 includes a locking body 94 and a receiver 100. The locking assembly 66 of FIGS. 6 and 7 may further include a roller 96 and a biasing element 98.

The locking body 94 is pivotably mounted to the blocker door body 60. For example, the locking body 94 of FIGS. 6 and 7 is pivotably mounted to the blocker door body 60 at (e.g., on, adjacent, or proximate) the outer side 76 along a pivot axis 102 of the locking body 94. The pivot axis 102 may generally extend in a direction (e.g., a lateral direction) between the first lateral end 72 and the second lateral end 74 (see FIG. 5). The locking body 94 may be pivotably mounted to the blocker door body 60 at an intermediate portion of the blocker door body 60, for example, between the upstream end 68 and the downstream end 70 or between the mounts 80 and the bumpers 82 (partially omitted in FIGS. 5 and 6 for clarity) (see FIG. 5). The locking body 94 forms or otherwise includes a first arm portion 104 and a second arm portion 106. The first arm portion 104 intersects the second arm portion 106 at (e.g., on, adjacent, or proximate) the pivot axis 102. The first arm portion 104 and the second arm portion 106 may be oriented generally orthogonally relative to one another. However, the present disclosure is not limited to any particular angular orientation of the first arm portion 104 relative to the second arm portion 106. The first arm portion 104 extends from the second arm portion 106 to a distal end 108 of the first arm portion 104. The first arm portion 104 may be curved between the second arm portion 106 and the distal end 108. For example, the first arm portion 104 may have a concave shape facing the axial centerline 36 and extending from the second arm portion 106 to the distal end 108 as shown, for example, in FIGS. 6 and 7. The roller 96 may be rotatably mounted to the first arm portion 104 at (e.g., on, adjacent, or proximate) the distal end 108. The second arm portion 106 extends from the first arm portion 104 to a distal end 110 of the second arm portion 106. The second arm portion 106 forms or otherwise includes a hook 112 at the distal end 110. The biasing element 98 (e.g., a spring) may be engaged with the locking body 94 and the blocker door body 60 to bias the locking body 94 in the unlocked condition, as will be discussed in further detail.

The receiver 100 is fixedly mounted to the translating sleeve 48 (e.g., an inner radial side of the translating sleeve 48). The receiver 100 includes a cylindrical pin or other engagement member fixed relative to the translating sleeve 48 and configured to engage the second arm portion 106 (e.g., the hook 112).

In operation, as the translating sleeve 48 translates from the deployed position to the stowed position, the locking body 94 contacts or otherwise engages the downstream wall 54 (e.g., the outer surface 55). For example, the locking body 94 may engage the downstream wall 54 with the roller 96 and the roller 96 may roll along the downstream wall 54. The rolling engagement between the roller 96 and the downstream wall 54 pivots the locking body 94 about the pivot axis 102 (e.g., in the counterclockwise direction as the locking body 94 is illustrated in FIG. 6), against the biasing force of the biasing element 98, causing the hook 112 to be disposed at (e.g., on, adjacent, or proximate) the receiver 100. For example, the hook 112 may engage (e.g., contact) the receiver 100. Alternatively, for example, the hook 112 may be disposed with a small gap between the hook 112 and the receiver 100. In this alternative configuration, the hook 112 may not generally contact the receiver 100 with the translating sleeve 48 in the stowed position. In the event of a failure of one or more of the hinges 62 with the translating sleeve 48 in the stowed position, the hook 112 may engage the receiver 100. The locking assembly 66 in the locked condition, with engagement between the roller 96 and the downstream wall 54 and with the hook 112 disposed at (e.g., on, adjacent, or proximate) the receiver 100, facilitates secure retention of the blocker door body 60 to the translating sleeve 48, facilitates a reduction in stress experienced by the hinge 62, and facilitates a reduction in likelihood of a loss of the blocker door 58 in the event of a hinge 62 or drag link 64 failure. As the translating sleeve 48 translates from the stowed position to the deployed position, the roller 96 disengages from the downstream wall 54 and the biasing element 98 causes the locking body 94 to pivot about the pivot axis 102 (e.g., in the clockwise direction as the locking body 94 is illustrated in FIG. 7) to separate the hook 112 from the receiver 100. The locking assembly 66 in this unlocked condition allows the blocker door body 60 to move into the thrust reverser duct 52, as the translating sleeve 48 translates into the deployed position, to direct air flow through the cascade elements 46.

Figure 8:
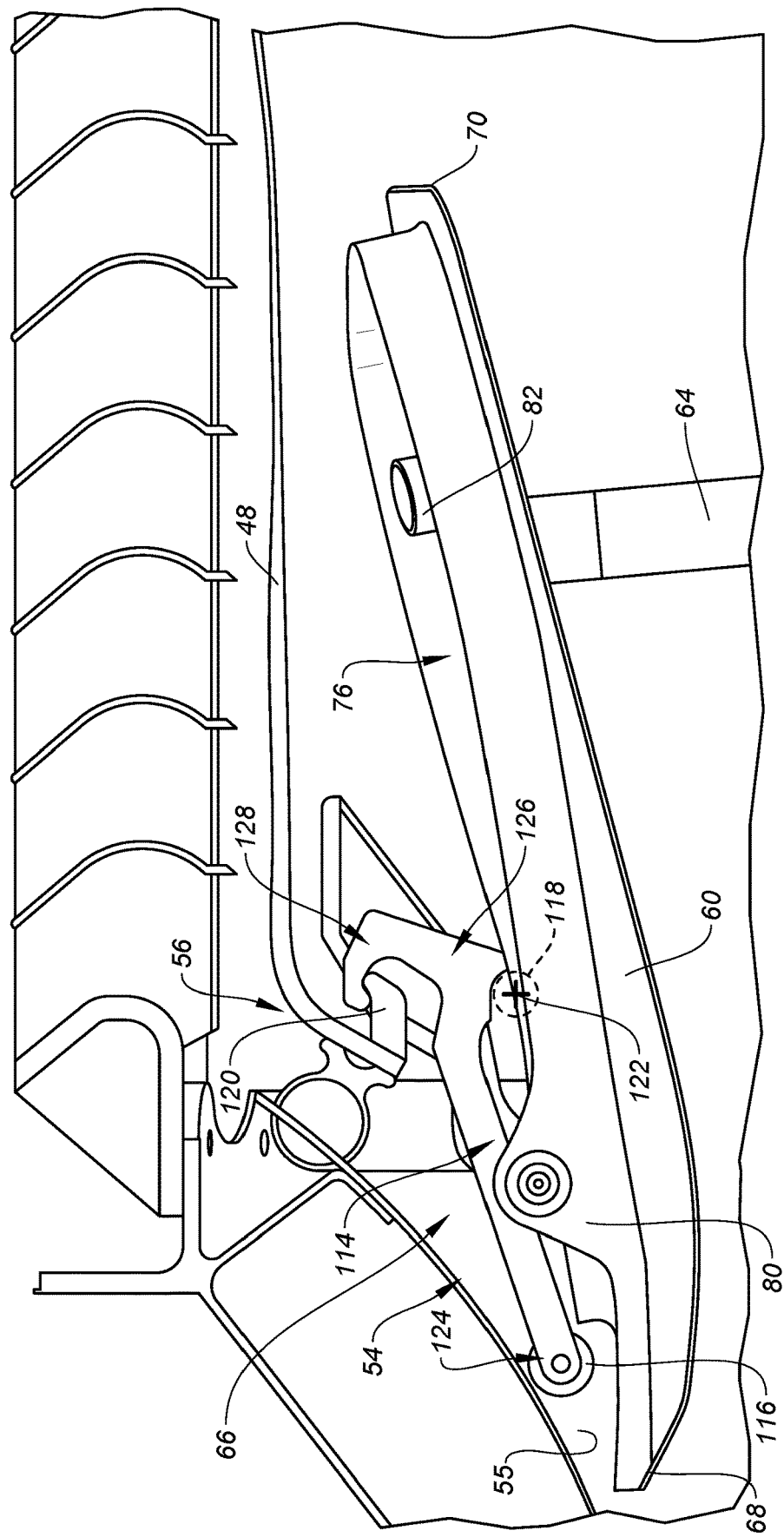
FIG. 8 illustrates a cutaway side view of another blocker door assembly for the thrust reverser of FIG. 3, the blocker door assembly including another locking assembly in a locked condition, in accordance with one or more embodiments of the present disclosure.
Figure 9:
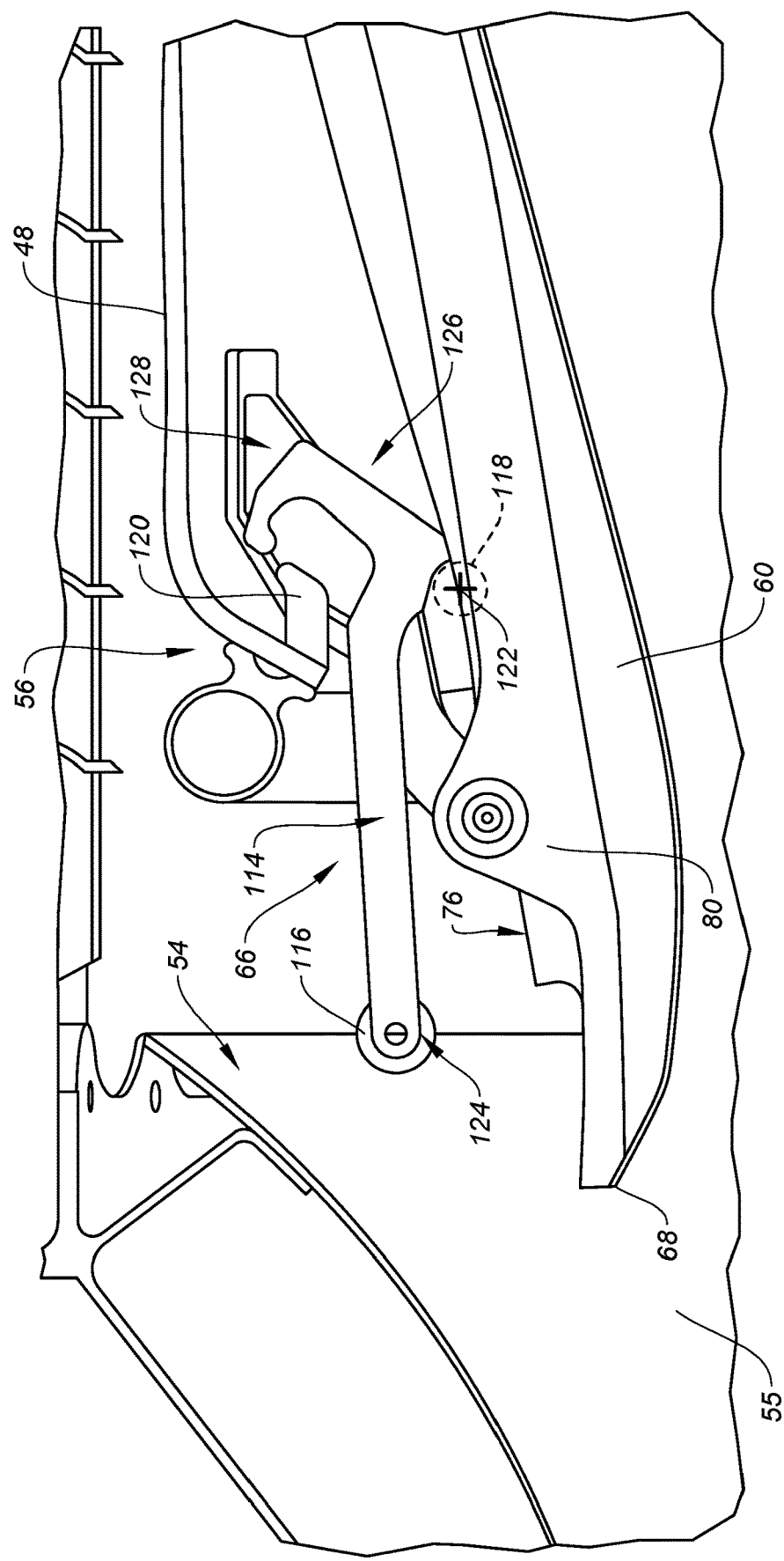
FIG. 9 illustrates a cutaway side view of the blocker door assembly of FIG. 8 with the locking assembly in an unlocked condition, in accordance with one or more embodiments of the present disclosure.

Referring to FIGS. 8 and 9, a second embodiment of the locking assembly 66 is illustrated. FIG. 8 illustrates the locking assembly 66 in the locked condition. FIG. 9 illustrates the locking assembly 66 in the unlocked condition. The locking assembly 66 of FIGS. 8 and 9 includes a locking body 114 and a receiver 120. The locking assembly 66 of FIGS. 8 and 9 may further include a roller 116 and a biasing element 118.

The locking body 114 is pivotably mounted to the blocker door body 60. For example, the locking body 114 of FIGS. 8 and 9 is pivotably mounted to the blocker door body 60 at (e.g., on, adjacent, or proximate) the outer side 76 along a pivot axis 122 of the locking body 114. The pivot axis 122 may generally extend in a direction (e.g., a lateral direction) between the first lateral end 72 and the second lateral end 74 (see FIG. 5). The locking body 94 may be pivotably mounted to the blocker door body 60 at an intermediate portion of the blocker door body 60, for example, between the upstream end 68 and the downstream end 70 or between the mounts 80 and the bumpers 82 (see FIG. 5). The locking body 114 extends between and to a first end 124 of the locking body 114 and a second end 126 of the locking body 114. The roller 116 is rotatably mounted to the locking body 114 at (e.g., on, adjacent, or proximate) the first end 124. The locking body 114 forms or otherwise includes a hook 128 at the second end 126. A portion of the hook 128 may be pivotably mounted to the blocker door body 60 along the pivot axis 122 as shown, for example, in FIGS. 8 and 9. The present disclosure, however, is not limited to this foregoing exemplary mounting configuration between the locking body 114 and the blocker door body 60. The biasing element 118 (e.g., a spring) is engaged with the locking body 114 and the blocker door body 60 to bias the locking body 114 in the unlocked condition, as will be discussed in further detail.

The receiver 120 is fixedly mounted to the translating sleeve 48 (e.g., an inner radial side of the translating sleeve 48). For example, the receiver 120 of FIGS. 8 and 9 is mounted to the translating sleeve 48 at (e.g., on, adjacent, or proximate) the upstream end 56. The upstream end 56 of the translating sleeve 48 of FIGS. 8 and 9 includes a curved portion which curves radially inward from downstream portions of the translating sleeve 48. The receiver 120 of FIGS. 8 and 9 is disposed at (e.g., on, adjacent, or proximate) the curved portion. The receiver 120 includes a hook or other engagement member fixed relative to the translating sleeve 48 and configured to engage the locking body 114 (e.g., the hook 128).

In operation, as the translating sleeve 48 translates from the deployed position to the stowed position, the locking body 114 contacts or otherwise engages the downstream wall 54 (e.g., the outer surface 55). For example, the locking body 114 may engage the downstream wall 54 with the roller 116 and the roller 116 may roll along the downstream wall 54. The rolling engagement between the roller 116 and the downstream wall 54 pivots the locking body 114 about the pivot axis 122 (e.g., in the counterclockwise direction as the locking body 114 is illustrated in FIG. 8), against the biasing force of the biasing element 118, causing the hook 128 to be disposed at (e.g., on, adjacent, or proximate) the receiver 120. For example, the hook 128 may engage (e.g., contact) the receiver 120. Alternatively, for example, the hook 128 may be disposed with a small gap between the hook 128 and the receiver 120. In this alternative configuration, the hook 128 may not generally contact the receiver 120 with the translating sleeve 48 in the stowed position. In the event of a failure of one or more of the hinges 62 with the translating sleeve 48 in the stowed position, the hook 128 may engage (e.g., contact) the receiver 120. The locking assembly 66 in the locked condition, with engagement between the roller 116 and the downstream wall 54 and with the hook 128 disposed at (e.g., on, adjacent, or proximate) the receiver 120, facilitates secure retention of the blocker door body 60 to the translating sleeve 48, facilitates a reduction in stress experienced by the hinge 62, and facilitates a reduction in likelihood of a loss of the blocker door 58 in the event of a hinge 62 or drag link 64 failure. As the translating sleeve 48 translates from the stowed position to the deployed position, the roller 116 disengages from the downstream wall 54 and the biasing element 118 causes the locking body 114 to pivot about the pivot axis 122 (e.g., in the clockwise direction as the locking body 114 is illustrated in FIG. 9) to separate the hook 128 from the receiver 120. The locking assembly 66 in this unlocked condition allows the blocker door body 60 to move into the thrust reverser duct 52, as the translating sleeve 48 translates into the deployed position, to direct air flow through the cascade elements 46.

Figure 10:
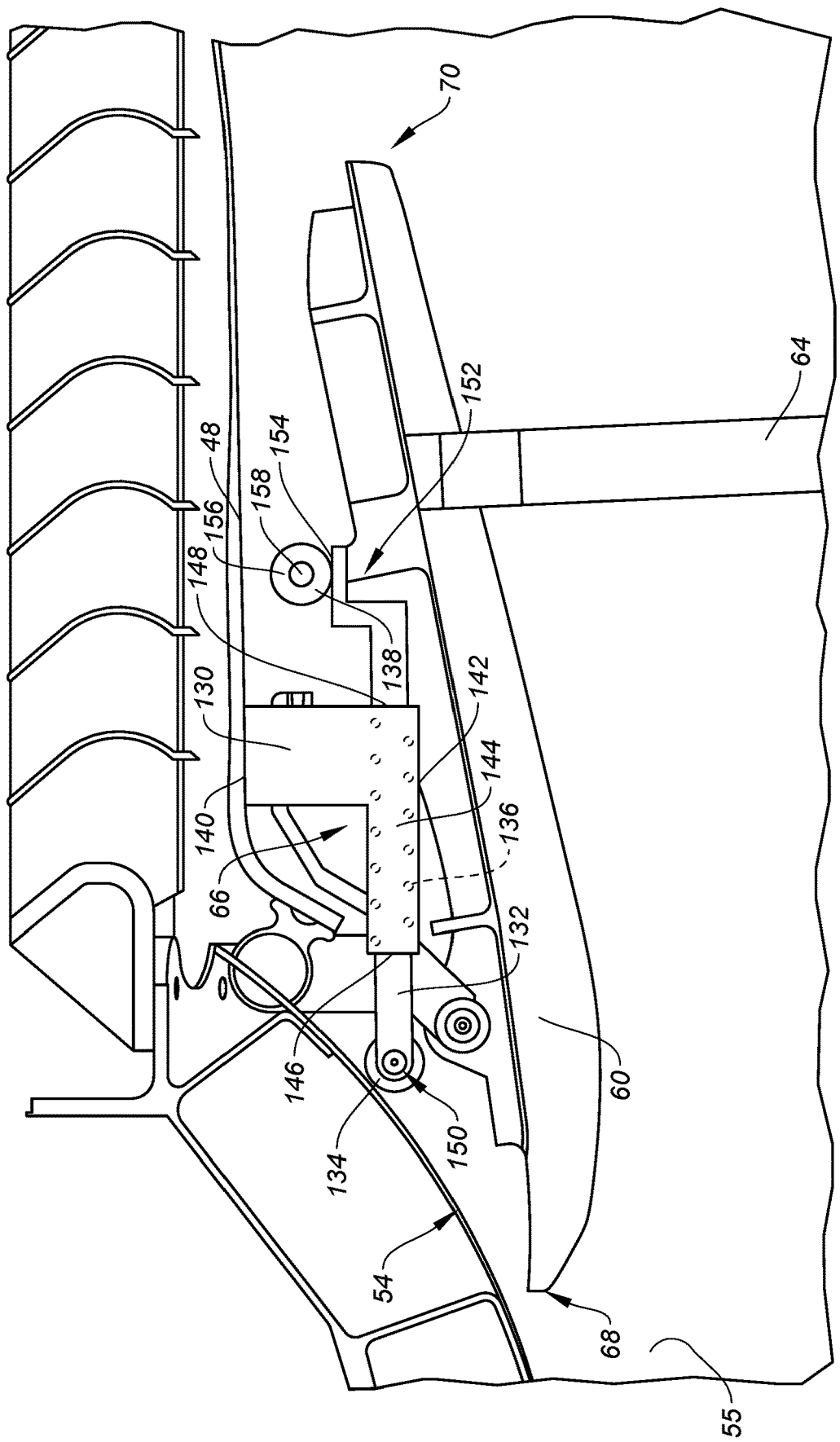
FIG. 10 illustrates a cutaway side view of another blocker door assembly for the thrust reverser of FIG. 3, the blocker door assembly including another locking assembly in a locked condition, in accordance with one or more embodiments of the present disclosure.
Figure 11:
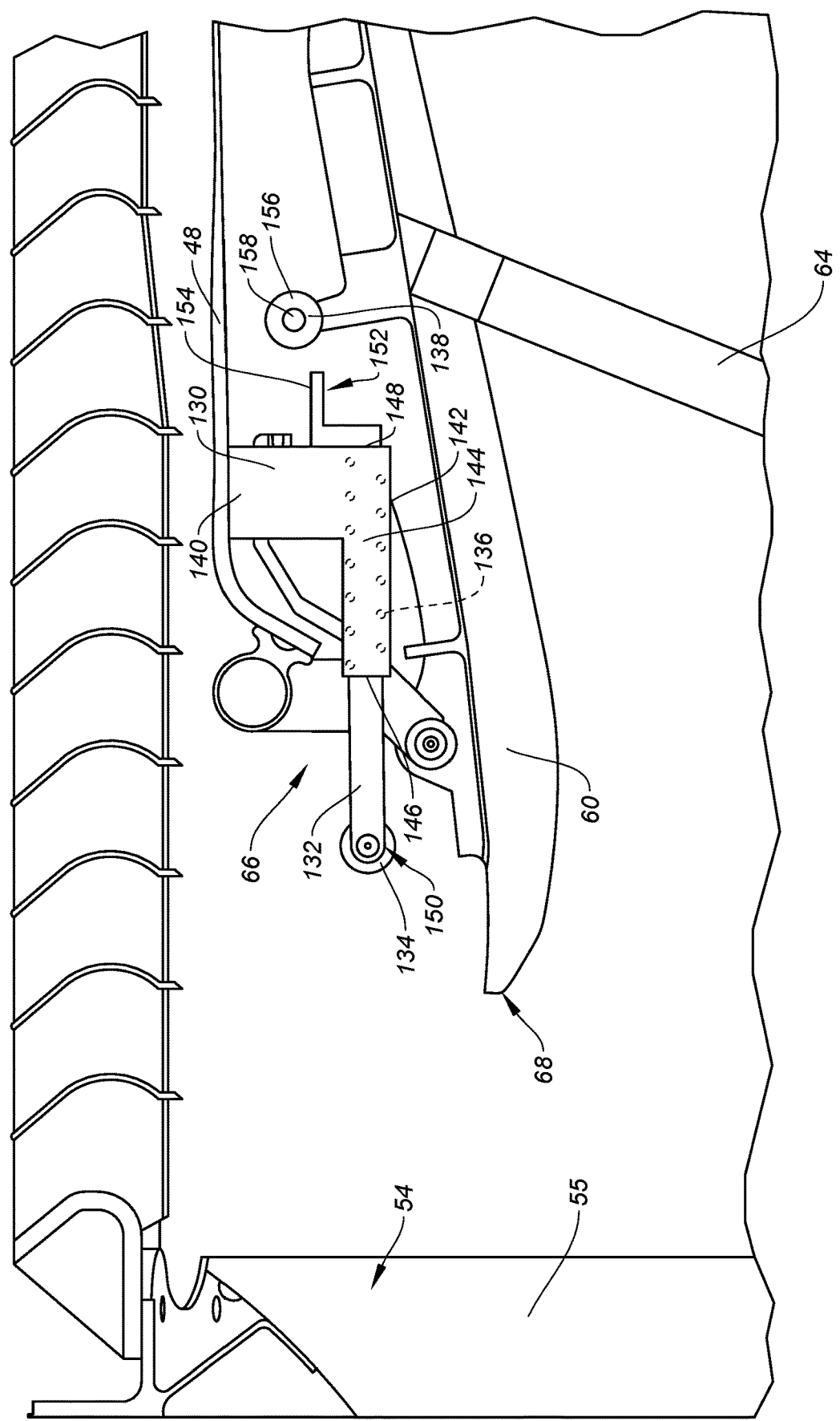
FIG. 11 illustrates a cutaway side view of the blocker door assembly of FIG. 10 with the locking assembly in an unlocked condition, in accordance with one or more embodiments of the present disclosure.

Referring to FIGS. 10 and 11, a third embodiment of the locking assembly 66 is illustrated. FIG. 10 illustrates the locking assembly 66 in the locked condition. FIG. 11 illustrates the locking assembly 66 in the unlocked condition. The locking assembly 66 of FIGS. 10 and 11 includes a housing 130, a locking body 132, and a receiver 138. The locking assembly 66 of FIGS. 10 and 11 may further include a roller 134 and a biasing element 136.

The housing 130 is fixedly mounted to the translating sleeve 48 (e.g., an inner radial side of the translating sleeve 48). The housing 130 extends between and to an outer end 140 of the housing 130 and an inner end 142 of the housing 130. The housing 130 may be configured with an "L" shape such that the housing 130 is longer (e.g., axially longer) at the inner end 142 than at the outer end 140. The housing 130 includes a guide portion 144 at (e.g., on, adjacent, or proximate) the inner end 142. The guide portion 144 forms a first aperture 146 and a second aperture 148 opposite (e.g., axially opposite) the first aperture 146.

The locking body 132 is slidingly mounted within the guide portion 144. For example, the locking body 132 extends within the guide portion 144 and through the first aperture 146 and the second aperture 148. The locking body 132 extends between and to a first end 150 of the locking body 132 and a second end 152 of the locking body 132. The roller 134 is rotatably mounted to the locking body 132 at (e.g., on, adjacent, or proximate) the first end 150. The locking body 132 forms a sliding surface 154 at (e.g., on, adjacent, or proximate) the second end 152. The sliding surface 154 may be an axially-extending surface. The sliding surface 154 may be disposed radially outward of the roller 134 as shown, for example, in FIGS. 10 and 11. The biasing element 136 is housed within the guide portion 144. The biasing element 136 (e.g., a spring) is engaged with the locking body 132 and the housing 130 (e.g., the guide portion 144) to bias the locking body 132 in the unlocked condition (e.g., to bias the locking body 132 in an axially forward position), as will be discussed in further detail.

The receiver 138 is fixedly mounted to the blocker door body 60 (e.g., the outer side 76). For example, the receiver 138 of FIGS. 10 and 11 is mounted to the blocker door body 60 at a position downstream (e.g., axially aft) of the housing 130 with the translating sleeve 48 and the blocker doors 58 in the stowed position as shown, for example, in FIG. 10. The receiver 138 includes a roller 156. The roller 156 is spaced outward from the outer side 76 (e.g., radially between the outer side 76 and the translating sleeve 48 with the translating sleeve 48 and the blocker doors 58 in the stowed position). The roller 156 is rotatable about a rotational axis 158, which rotational axis 158 may be fixed relative to the blocker door body 60.

In operation, as the translating sleeve 48 translates from the deployed position to the stowed position, the locking body 132 contacts or otherwise engages the downstream wall 54 (e.g., the outer surface 55). For example, the locking body 132 may engage the downstream wall 54 with the roller 134 and the roller 134 may roll along the downstream wall 54. The rolling engagement between the roller 134 and the downstream wall 54 pushes (e.g., axially translates) the locking body 132 into the guide portion 144 against the biasing force of the biasing element 136, causing the sliding surface 154 to be disposed at (e.g., on, adjacent, or proximate) the roller 156. For example, the sliding surface 154 may engage (e.g., contact) the roller 156. Alternatively, for example, the sliding surface 154 may be disposed with a small gap between the sliding surface 154 and the roller 156. In this alternative configuration, the sliding surface 154 may not generally contact the roller 156 with the translating sleeve 48 in the stowed position. In the event of a failure of one or more of the hinges 62 with the translating sleeve 48 in the stowed position, the sliding surface 154 may engage the roller 156. While the roller 156 is illustrated in FIGS. 10 and 11 as being mounted to the blocker door body 60, the roller 156 may alternatively be mounted to the locking body 132 (e.g., at the second end 152) and the sliding surface 154 may be formed by the receiver 138. The locking assembly 66 in the locked condition, with engagement between the roller 134 and the downstream wall 54 and with the locking body 132 (e.g., the sliding surface 154) disposed at (e.g., on, adjacent, or proximate) the receiver 138 (e.g., the roller 156), facilitates secure retention of the blocker door body 60 to the translating sleeve 48, facilitates a reduction in stress experienced by the hinge 62, and facilitates a reduction in likelihood of a loss of the blocker door 58 in the event of a hinge 62 or drag link 64 failure. As the translating sleeve 48 translates from the stowed position to the deployed position, the roller 134 disengages from the downstream wall 54 and the biasing element 136 causes the locking body 132 to translate away from the receiver 138 and to separate the sliding surface 154 from the roller 156. The locking assembly 66 in this unlocked condition allows the blocker door body 60 to move into the thrust reverser duct 52, as the translating sleeve 48 translates into the deployed position, to direct air flow through the cascade elements 46.

Figure 12:
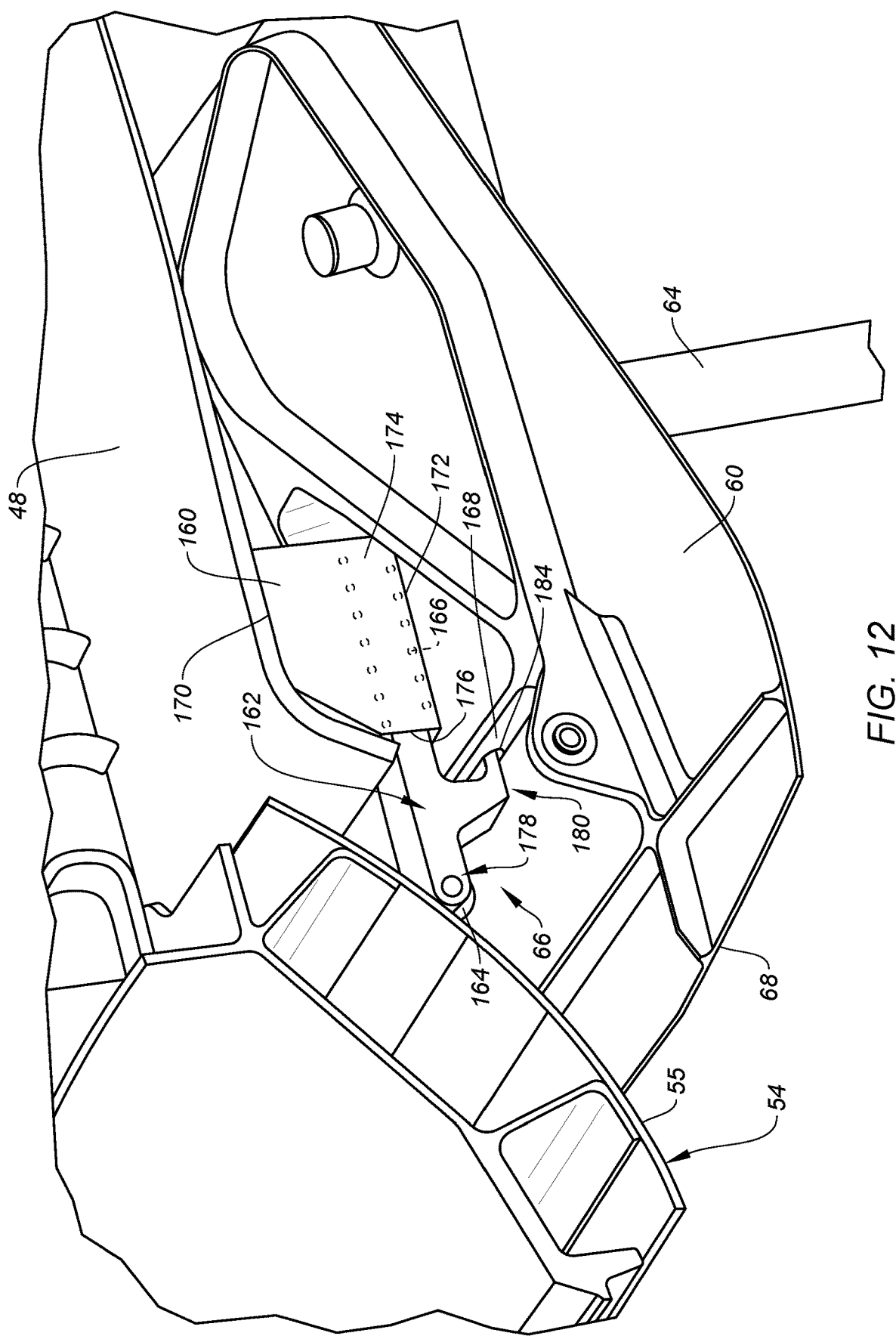
FIG. 12 illustrates a cutaway side view of another blocker door assembly for the thrust reverser of FIG. 3, the blocker door assembly including another locking assembly in a locked condition, in accordance with one or more embodiments of the present disclosure.
Figure 13:
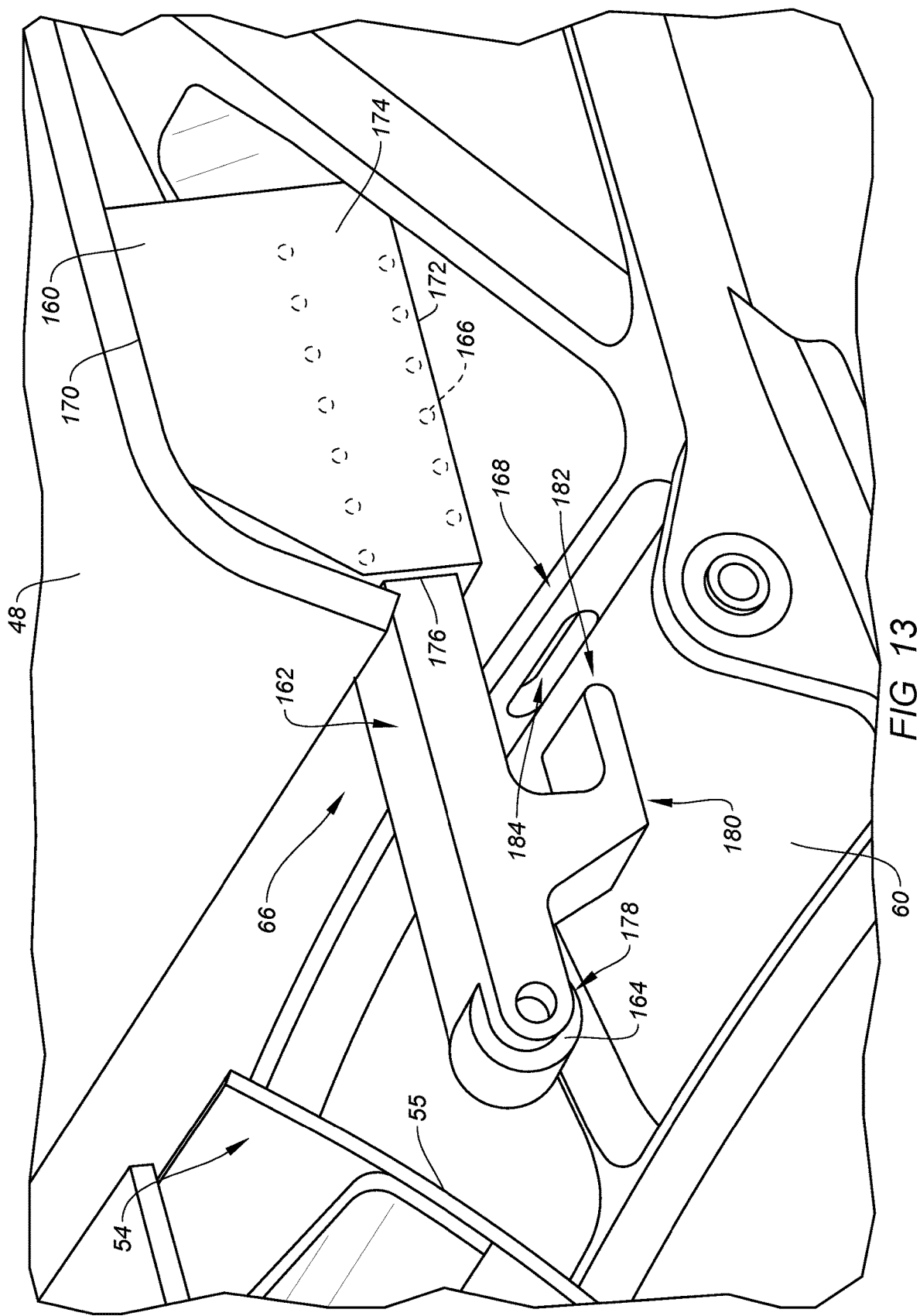
FIG. 13 illustrates a cutaway side view of the blocker door assembly of FIG. 12 with the locking assembly in an unlocked condition, in accordance with one or more embodiments of the present disclosure.

Referring to FIGS. 12 and 13, a fourth embodiment of the locking assembly 66 is illustrated. FIG. 12 illustrates the locking assembly 66 in the locked condition. FIG. 13 illustrates the locking assembly 66 in the unlocked condition. The locking assembly 66 of FIGS. 12 and 13 includes a housing 160, a locking body 162, and a receiver 168. The locking assembly 66 of FIGS. 12 and 13 may further include a roller 164 and a biasing element 166.

The housing 160 is fixedly mounted to the translating sleeve 48 (e.g., an inner radial side of the translating sleeve 48). The housing 160 extends between and to an outer end 170 of the housing 160 and an inner end 172 of the housing 160. The housing 160 may be longer (e.g., axially longer) at the inner end 172 than at the outer end 170. The housing 160 includes a guide portion 174 at (e.g., on, adjacent, or proximate) the inner end 172. The guide portion 174 forms a first aperture 176. The guide portion 174 may further form a second aperture (not shown) opposite (e.g., axially opposite) the first aperture 176.

The locking body 162 is slidingly mounted within the guide portion 174. For example, the locking body 162 extends within the guide portion 174 and through the first aperture 176. The locking body 162 extends between and to a first end 178 of the locking body 162 and a second end (not shown; disposed within the guide portion 174 of FIGS. 12 and 13) of the locking body 162. The roller 164 is rotatably mounted to the locking body 162 at (e.g., on, adjacent, or proximate) the first end 178. The locking body 162 forms a hook 180. The hook 180 is disposed on an intermediate portion of the locking body 162 between the first end 178 and the second end of the locking body 162. The hook 180 is disposed outside of the guide portion 174. The hook 180 is disposed on an inner radial side of the locking body 162. At least a portion of the hook 180 extends in a downstream (e.g., an axially aft) direction to a distal end 182 of the hook 180. The distal end 182 is disposed radially inward of the first end 178. The biasing element 166 is housed within the guide portion 174. The biasing element 166 (e.g., a spring) is engaged with the locking body 162 and the housing 160 (e.g., the guide portion 174) to bias the locking body 162 in the unlocked condition (e.g., to bias the locking body 162 in an axially forward position), as will be discussed in further detail.

The blocker door body 60 of FIGS. 12 and 13 forms the receiver 168. The receiver 168 forms a slot 184 for the hook 180. The slot 184 is formed through the receiver 168 in a generally axial direction with the translating sleeve 48 and the blocker doors 58 in the stowed position.

In operation, as the translating sleeve 48 translates from the deployed position to the stowed position, the locking body 162 contacts or otherwise engages the downstream wall 54 (e.g., the outer surface 55). For example, the locking body 162 may engage the downstream wall 54 with the roller 164 and the roller 164 may roll along the downstream wall 54. The rolling engagement between the roller 164 and the downstream wall 54 pushes (e.g., axially translates) the locking body 162 into the guide portion 174 against the biasing force of the biasing element 166, causing the hook 180 to be directed into and disposed within the slot 184 and, thereby, disposed at (e.g., on, adjacent, or proximate) the receiver 168. For example, the hook 180 may engage (e.g., contact) the receiver 168 within the slot 184. Alternatively, for example, the hook 180 may be disposed with a small gap between the hook 180 and the receiver 168 with the hook 180 disposed within the slot 184. In this alternative configuration, the hook 180 may not generally contact the receiver 168 with the translating sleeve 48 in the stowed position. In the event of a failure of one or more of the hinges 62 with the translating sleeve 48 in the stowed position, the hook 180 may engage (e.g., contact) the receiver 168. The locking assembly 66 in the locked condition, with engagement between the roller 164 and the downstream wall 54 and with the locking body 162 (e.g., the hook 180) disposed at (e.g., on, adjacent, or proximate) the receiver 168 within the slot 184, facilitates secure retention of the blocker door body 60 to the translating sleeve 48, facilitates a reduction in stress experienced by the hinge 62, and facilitates a reduction in likelihood of a loss of the blocker door 58 in the event of a hinge 62 or drag link 64 failure. As the translating sleeve 48 translates from the stowed position to the deployed position, the roller 164 disengages from the downstream wall 54 and the biasing element 166 causes the hook 180 to translate away from (e.g., out of) the receiver 168 and its slot 184. The locking assembly 66 in this unlocked condition allows the blocker door body 60 to move into the thrust reverser duct 52, as the translating sleeve 48 translates into the deployed position, to direct air flow through the cascade elements 46.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A thrust reverser for an aircraft propulsion system, the thrust reverser comprising:
    a fixed thrust reverser structure, the fixed thrust reverser structure includes a wall extending circumferentially about an axis of the thrust reverser;
    a translating sleeve extending circumferentially about the axis to form a thrust reverser duct of the thrust reverser, the translating sleeve is configured to translate between a first stowed translating sleeve position and a second translating sleeve position, the translating sleeve includes an upstream end, and the upstream end is disposed at the wall with the translating sleeve in the first stowed translating sleeve position; and
    a blocker door assembly including a plurality of blocker doors, each blocker door of the plurality of blocker doors includes a blocker door body and a hinge, the blocker door body is pivotably mounted to the translating sleeve by the hinge, the blocker door body is pivotable about the hinge between a first stowed blocker door position and a second blocker door position, translation of the translating sleeve from the first stowed translating sleeve position to the second translating sleeve position effects pivoting of the blocker door body from the first stowed blocker door position to the second blocker door position; and
    a locking assembly including a locking body and a receiver, the locking body mounted to one of the translating sleeve or the blocker door assembly, the receiver mounted to the other of the blocker door assembly or the translating sleeve, the locking body is moveable between a locked position and an unlocked position;

in the locked position, the locking body is engaged with the wall and the locking body is disposed at the receiver; and in the unlocked position, the locking body is disengaged with the wall and the receiver to allow the blocker door body to pivot from the first stowed blocker door position to the second blocker door position as the translating sleeve translates from the first stowed translating sleeve position to the second translating sleeve position.

2. The thrust reverser of claim 1, wherein the locking assembly further includes a roller rotatably mounted to the locking body, and the locking body engages the wall with the roller in the first stowed blocker door position.

3. The thrust reverser of claim 1, wherein the locking assembly further includes a biasing element, and the biasing element is configured to bias the locking body in the unlocked position.

4. The thrust reverser of claim 1, wherein the receiver is fixedly mounted to the translating sleeve.

5. The thrust reverser of claim 4, wherein the locking body is pivotably mounted to the blocker door body at a pivot axis.

6. The thrust reverser of claim 5, wherein the locking body includes a first arm portion and a second arm portion, the first arm portion intersects the second arm portion at the pivot axis, the first arm portion includes a first distal end configured to engage the wall with the locking body in the locked position, the second arm portion includes a second distal end and a hook disposed at the second distal end, and the hook is configured to be disposed at the receiver with the locking body in the locked position.

7. The thrust reverser of claim 6, wherein the first arm portion is oriented orthogonally relative to the second arm portion.

8. The thrust reverser of claim 6, wherein the second arm portion is pivotably mounted to the blocker door body at the hook.

9. The thrust reverser of claim 1, wherein the receiver is fixedly mounted to the blocker door body.

10. The thrust reverser of claim 9, wherein the locking assembly further includes a housing fixedly mounted to the translating sleeve, the locking body is mounted within the housing, and the locking body is configured to translate within the housing between the locked position and the unlocked position.

11. The thrust reverser of claim 10, wherein the receiver includes a roller, and the roller is engaged with the locking body with the locking body in the locked position.

12. The thrust reverser of claim 10, wherein the locking body includes a hook, the blocker door body forms the receiver, the receiver forms a slot, and the hook is disposed within the slot with the locking body in the locked position.

13. The thrust reverser of claim 1, wherein the wall slopes radially outward in an axially forward to an axially aft direction.

14. The thrust reverser of claim 1, further comprising an inner fixed structure forming an inner radial boundary of the thrust reverser duct, wherein each blocker door of the plurality of blocker doors further includes a drag link pivotably mounted to the inner fixed structure and the blocker door body.

15. A thrust reverser for an aircraft propulsion system, the thrust reverser comprising:

a torque box, the torque box includes a wall extending circumferentially about an axis of the thrust reverser;

a translating sleeve disposed aft of the torque box, the translating sleeve is configured to translate between a forward translating sleeve position and an aft translating sleeve position; and a blocker door assembly including a plurality of blocker doors, each blocker door of the plurality of blocker doors includes a blocker door body and a hinge, the blocker door body is pivotably mounted to the translating sleeve by the hinge, the blocker door body is pivotable about the hinge between a first stowed blocker door position and a second blocker door position, translation of the translating sleeve from the forward translating sleeve position to the aft translating sleeve position effects pivoting of the blocker door body from the first stowed blocker door position to the second blocker door position; and a locking assembly including a locking body and a receiver, the locking body mounted to one of the translating sleeve or the blocker door assembly, the receiver mounted to the other of the blocker door assembly or the translating sleeve, the locking body is moveable between a locked position and an unlocked position;

in the locked position, the locking body is engaged with the wall and disposed at the receiver to lock the blocker door body in the first stowed blocker door position; and translation of the translating sleeve from the forward translating sleeve position to the aft translating sleeve position effects movement of the locking body from the locked position to the unlocked position with the locking body disengaged from the wall and the receiver in the unlocked position.

16. The thrust reverser of claim 15, wherein the locking assembly further includes a roller rotatably mounted to the locking body, and the locking body engages the wall with the roller in the first stowed blocker door position.

17. The thrust reverser of claim 15, wherein the locking assembly further includes a biasing element, and the biasing element is configured to bias the locking body in the unlocked position.

18. The thrust reverser of claim 17, wherein the biasing element is a spring.

19. A thrust reverser for an aircraft propulsion system, the thrust reverser comprising:

a fixed thrust reverser structure, the fixed thrust reverser structure includes a wall extending circumferentially about an axis of the thrust reverser;

a translating sleeve extending circumferentially about the axis to form a thrust reverser duct of the thrust reverser, the translating sleeve is configured to translate between a first stowed translating sleeve position and a second translating sleeve position; and a blocker door assembly including a plurality of blocker doors, each blocker door of the plurality of blocker doors includes a blocker door body and a hinge, the blocker door body is pivotably mounted to the translating sleeve by the hinge, the blocker door body is pivotable about the hinge between a first stowed blocker door position and a second blocker door position; and a locking assembly including a locking body, a roller, a biasing element, and a receiver, the locking body mounted to one of the translating sleeve or the blocker door assembly, the receiver mounted to the other of the blocker door assembly or the translating sleeve, the locking body is moveable between a locked position and an unlocked position, the roller is rotatably mounted to the locking body at a forward end of the locking body, and the biasing element is configured to bias the locking body in the unlocked position;

in the locked position, the roller is engaged with the wall; and in the unlocked position, the roller is disengaged with the wall to allow the blocker door body to pivot from the first stowed blocker door position to the second blocker door position.

20. The thrust reverser of claim 19, wherein the wall slopes radially outward in an axially forward to an axially aft direction, and the wall forms an outer surface having a convex shape facing the axis.

* * * * *